May 22, 1928.

E. S. MacPHERSON 1,670,368

STUFFING BOX CONSTRUCTION FOR PUMPS

Filed July 28, 1924

Inventor
Earle S. MacPherson

By Whittemore Hulbert Whittemore Belknap
Attorneys

Patented May 22, 1928.

1,670,368

UNITED STATES PATENT OFFICE.

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA.

STUFFING-BOX CONSTRUCTION FOR PUMPS.

Application filed July 28, 1924. Serial No. 728,723.

This invention relates generally to pumps and refers more particularly to water pumps designed to effect the circulation of the cooling water of an internal combustion engine.

One of the essential objects of the invention is to provide simple and effective means for positively lubricating the packing rings surrounding the rotating shafts of such pumps.

With the above and other objects in view, the invention consists in certain novel features of construction, combinations and arrangements of parts as will be more fully described and particularly pointed out in the appended claim.

Figure 1:
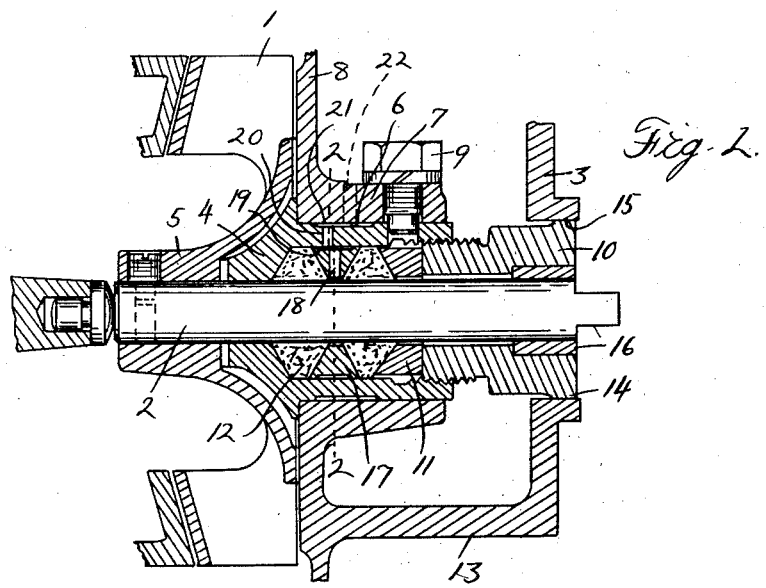
Figure 1 shows a vertical sectional view through a pump assembly embodying my invention.
Figure 2:
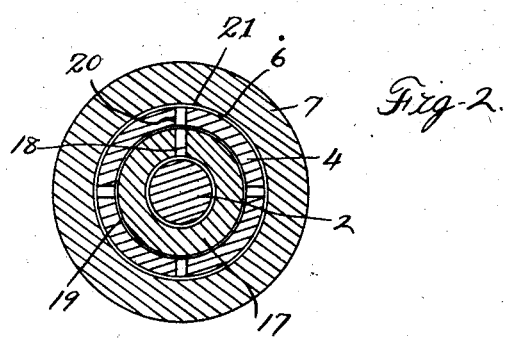
Figure 2 is a sectional view taken on the line 2—2 of Figure 1.

Heretofore only one packing ring has been used on the rotating shaft of water pumps of the type described, and the lubricant has been forced by suitable means to either the left or right of the ring for lubricating the same. However it has been found that such constructions are objectionable because the lubricant can escape without touching the packing rings and therefore does not insure the positive lubrication thereof. With the present invention the objections just referred to are entirely overcome and I have preferably provided spaced packing rings and direct the lubricant between the same so that it must pass the packing rings to escape.

Referring now to the drawings in which like characters of reference designate corresponding parts throughout the several views, the numeral 1 designates a rotor mounted upon a shaft 2 which extends through the rear end wall 3 of the pump casing and is preferably journaled in a stuffing box 4 located adjacent to the hub 5 of the rotor. This stuffing box 4 is preferably cup shaped and fits in an aperture 6 formed by a horizontal flange 7 upon the partition wall 8 of the pump casing. A cap bolt 9 is preferably used to secure the stuffing box 4 in place, while a nut 10 preferably threadedly engages the open end of the stuffing box and is adapted to move a suitable gland 11 in the stuffing box for compressing the metallic packing rings 12 surrounding the shaft 2. This nut is insertable axially inward of the shaft 2 within the horizontal portion 13 of the pump casing and has at its outer end a horizontal flange 14 which fits within an aperture 15 formed in the rear end wall 3 of the pump casing. As shown, the nut forms a bearing for the rear end of the shaft and preferably receives a bushing 16 in which the rear end of the shaft is journaled.

In order that both packing rings 12 may be positively lubricated, I preferably provide a bronze spacer ring 17 that surrounds the shaft 2 between the packing rings 12 and is provided with spaced radially extending passages 18 which communicate with a peripheral groove or channel 19. Communicating with this channel 19 are a series of spaced radially extending passages 20 which extend through the stuffing box 4 and connect into a peripheral groove 21. This groove 21 preferably communicates in turn with a suitable passage 22 that extends transversely of the pump casing and receives the lubricant from a suitable source of supply (not shown). Thus, with this construction the lubricant supplied to the spacer 17 will have to pass the packing rings 12 before it can escape, hence positive and complete lubrication is ensured for the packing rings.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

In a pump, the combination with a pump casing having spaced vertical walls provided with aligned openings therethrough and horizontal annular flanges surrounding said openings, a cylindrical cup shaped stuffing box extending through one of said openings and supported in the horizontal flange thereof, a rotatable shaft extending through an opening in said stuffing box, packing rings in said stuffing box surrounding said shaft, a gland for retaining said packing rings therein, a nut insertable through the opening in the other wall of the casing and adapted to compress the gland against the packing rings, said nut being provided with a bore constituting a bearing for the shaft, and means for lubricating said shaft.

In testimony whereof I affix my signature.

EARLE S. MacPHERSON.